United States Patent
Muta (10) Patent No.: US 11,019,535 B2
(45) Date of Patent: May 25, 2021

(54) COMMUNICATION CONTROL APPARATUS AND QOS CONTROL METHOD

(71) Applicant: Panasonic Intellectual Property Management Co., Ltd., Osaka (JP)

(72) Inventor: Ryuji Muta, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 20 days.

(21) Appl. No.: 16/545,911

(22) Filed: Aug. 20, 2019

(65) Prior Publication Data

US 2019/0373510 A1 Dec. 5, 2019

Related U.S. Application Data

(63) Continuation of application No. PCT/JP2017/015642, filed on Apr. 19, 2017.

(30) Foreign Application Priority Data

Feb. 27, 2017 (JP) .............................. JP2017-034885

(51) Int. Cl.
*H04W 28/18* (2009.01)
*H04W 24/02* (2009.01)
(Continued)

(52) U.S. Cl.
CPC ........... *H04W 28/18* (2013.01); *H04W 24/02* (2013.01); *H04W 72/1252* (2013.01); *H04W 92/12* (2013.01)

(58) Field of Classification Search
CPC . H04W 28/18; H04W 24/02; H04W 72/1252; H04W 92/12; H04W 28/0268;
(Continued)

(56) References Cited

U.S. PATENT DOCUMENTS

2007/0058544 A1 3/2007 Kim et al.
2010/0265823 A1 10/2010 Zhao et al.
(Continued)

FOREIGN PATENT DOCUMENTS

JP 2007-028638 A 2/2007
JP 2012-524463 A1 10/2012
(Continued)

OTHER PUBLICATIONS

International Search Report, dated Jul. 4, 2017, for corresponding International Application No. PCT/JP2017/015642.

*Primary Examiner* — Ricky Q Ngo
*Assistant Examiner* — Michael K Phillips
(74) *Attorney, Agent, or Firm* — Seed IP Law Group LLP (57) ABSTRACT

A communication control apparatus includes: a storage, which, in operation, stores an offset value of each of parameters of a quality of service (QoS) class identifier (QCI) in association with a property of each of base stations; offset determination circuitry, which, in operation, determines, based on base station identification information included in a request signal that is received, a property of a specific base station that has transmitted the request signal, and determines whether offset of each of the parameters is required for the specific base station based on the property; offset calculation circuitry, which, in operation, calculates an offset value of each of the parameters corresponding to the property of the specific base station when the offset is required; and a transmitter, which, in operation, transmits information indicating the offset value to the specific base station.

4 Claims, 11 Drawing Sheets

TABLE #2

| CONTENTS OF SERVICE | QCI | Offset_Priority | Offset_PDB | Offset_PELR |
|---|---|---|---|---|
| A | 7 | 1 | +50 | 1 |
| B | 4 | -2 | -10 | -3 |
|   | 8 | -1 | -50 | -2 |
|   | 9 | 1 | -10 | 2 |
| C | 0 | 0 | 0 | 0 |

(51) Int. Cl.
*H04W 72/12* (2009.01)
*H04W 92/12* (2009.01)

(58) Field of Classification Search
CPC . H04W 28/24; H04W 72/1242; H04W 88/12;
H04W 72/048; H04W 52/0206; H04W
72/04; H04L 5/1438; H04L 47/2491;
H04L 47/2433
See application file for complete search history.

(56) References Cited

U.S. PATENT DOCUMENTS

| | | | | |
|---|---|---|---|---|
| 2015/0131436 | A1* | 5/2015 | Backman | H04W 28/0268 |
| | | | | 370/230 |
| 2016/0112896 | A1* | 4/2016 | Karampatsis | H04W 28/0289 |
| | | | | 370/230.1 |
| 2016/0205585 | A1* | 7/2016 | Itoh | H04W 28/0289 |
| | | | | 370/235 |
| 2016/0295473 | A1* | 10/2016 | Lee | H04W 36/0022 |
| 2017/0250790 | A1 | 8/2017 | He et al. | |
| 2018/0287767 | A1* | 10/2018 | Paredes Cabrera | H04W 72/10 |

FOREIGN PATENT DOCUMENTS

| | | |
|---|---|---|
| JP | 2015-510377 A | 4/2015 |
| WO | 2010/121204 A1 | 10/2010 |
| WO | 2013/138031 A1 | 9/2013 |

* cited by examiner

TABLE #1

| eNodeB ID | CONTENTS OF SERVICE |
|---|---|
| X | A |
| Y | A,B |
| Z | C |

FIG. 4

TABLE #2

| CONTENTS OF SERVICE | QCI | Offset_Priority | Offset_PDB | Offset_PELR |
|---|---|---|---|---|
| A | 7 | 1 | +50 | 1 |
| B | 4 | -2 | -10 | -3 |
|   | 8 | -1 | -50 | -2 |
|   | 9 | 1 | -10 | 2 |
| C | 0 | 0 | 0 | 0 |

TABLE #3

| UE IDENTIFICATION INFORMATION AND QCI INFORMATION | Offset_Priority | Offset_PDB | Offset_PELR |
|---|---|---|---|
| (a,7) | 1 | +50 | 1 |
| (a,8) | -2 | -10 | -3 |
| (b,3) | -1 | -50 | -2 |
| (b,4) | 1 | -10 | 2 |

FIG. 10

TABLE #4

| QCI | PRIORITY AFTER CORRECTION | PDB AFTER CORRECTION | PELR AFTER CORRECTION |
|---|---|---|---|
| 1 | 1 | 50 | $10^2$ |
| 2 | 2 | 10 | $10^3$ |
| … |  | 50 | $10^2$ |
| 9 | 9 | 10 | $10^3$ |

FIG. 11

TABLE #5

| QCI | PRIORITY AFTER CORRECTION | PDB AFTER CORRECTION | PELR AFTER CORRECTION |
|---|---|---|---|
| 1 | 1 | 30 | $10^3$ |
| 2 | 2 | 20 | $10^4$ |

COMMUNICATION CONTROL APPARATUS AND QOS CONTROL METHOD

RELATED APPLICATIONS

This application is a continuation of PCT International Application No. PCT/JP2017/015642, filed on Apr. 19, 2017, which claims the benefit of foreign priority of Japanese patent application 2017-034885 filed on Feb. 27, 2017, the contents all of which are incorporated herein by reference.

BACKGROUND

1. Technical Field

The present disclosure relates to a communication control apparatus and a quality of service (QoS) control method.

2. Description of the Related Art

QoS, which is service quality provided on a network, is predetermined for each application in a wireless communication system. As a parameter for treating the QoS, a QoS class identifier (QCI) is defined in a document of the 3rd generation partnership project (3GPP). Based on the QCI, a user equipment (UE: terminal) and an evolved Node B (eNodeB: base station) perform priority control, thereby preventing an important packet from being discarded, when a part of packets needs to be discarded due to, for example, concentration of traffic.

For each QCI value, the 3GPP defines parameters such as a guaranteed data rate (GBR), priority, an allowable delay time (PDB), and a packet loss rate (PELR). JP-T-2012-524463 describes a technique for attaching an offset value to each existing parameter of the QCI for each terminal according to service to be used, to flexibly set each parameter.

SUMMARY

One non-limiting and exemplary embodiment discloses a communication control apparatus and a QoS control method capable of flexibly setting an offset value of each parameter of the QCI without increasing traffic.

In one general aspect, the techniques disclosed here feature a communication control apparatus including a storage, which, in operation, stores an offset value of each of parameters of a quality of service (QoS) class identifier (QCI) in association with a property of each of base stations, offset determination circuitry, which, in operation, determines the property of a specific base station that has transmitted a request signal based on base station identification information included in the request signal that is received, and determines whether offset of each of the parameters is required for the specific base station based on the property, offset calculation circuitry, which, in operation, calculates an offset value of each of the parameters corresponding to the property of the specific base station when the offset is required, and a transmitter, which, in operation, transmits information indicating the offset value to the specific base station.

In another general aspect, the techniques disclosed here feature a quality of service (QoS) control method including receiving a request signal including base station identification information from a specific base station, determining a property of the specific base station based on the base station identification information, determining whether offset of each of parameters of a QoS class identifier (QCI) is required for the specific base station based on the property, calculating an offset value of each of the parameters corresponding to the property of the specific base station when the offset is required, and transmitting information indicating the offset value to the specific base station.

It should be noted that general or specific embodiments may be implemented as a system, a device, a method, an integrated circuit, a computer program, a storage medium, or any selective combination thereof.

According to one aspect of the present disclosure, the offset value of each parameter of the QCI can flexibly be set without increasing traffic.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prior to describing exemplary embodiments according to the present disclosure, a problem found in a conventional technique will briefly be described. Setting an offset value of each parameter of a QCI to each and every UE necessitates an eNodeB to perform resource allocation in consideration of all offset values upon scheduling, thereby complicating management when a number of UE is increased. Further, setting the offset value of each parameter of the QCI to each UE increases a transmission amount of signaling for notifying the offset value from the UE to the eNodeB of the offset value, thereby increasing traffic of an uplink.

Hereinafter, exemplary embodiments of the present disclosure will be described in detail with reference to the drawings as appropriate. It should be noted that the attached drawings and the following description are provided for those skilled in the art to fully understand the present disclosure, and are not intended to limit the subject matter as described in the appended claims.

First Exemplary Embodiment

<Configuration of Communication System>

Figure 1:
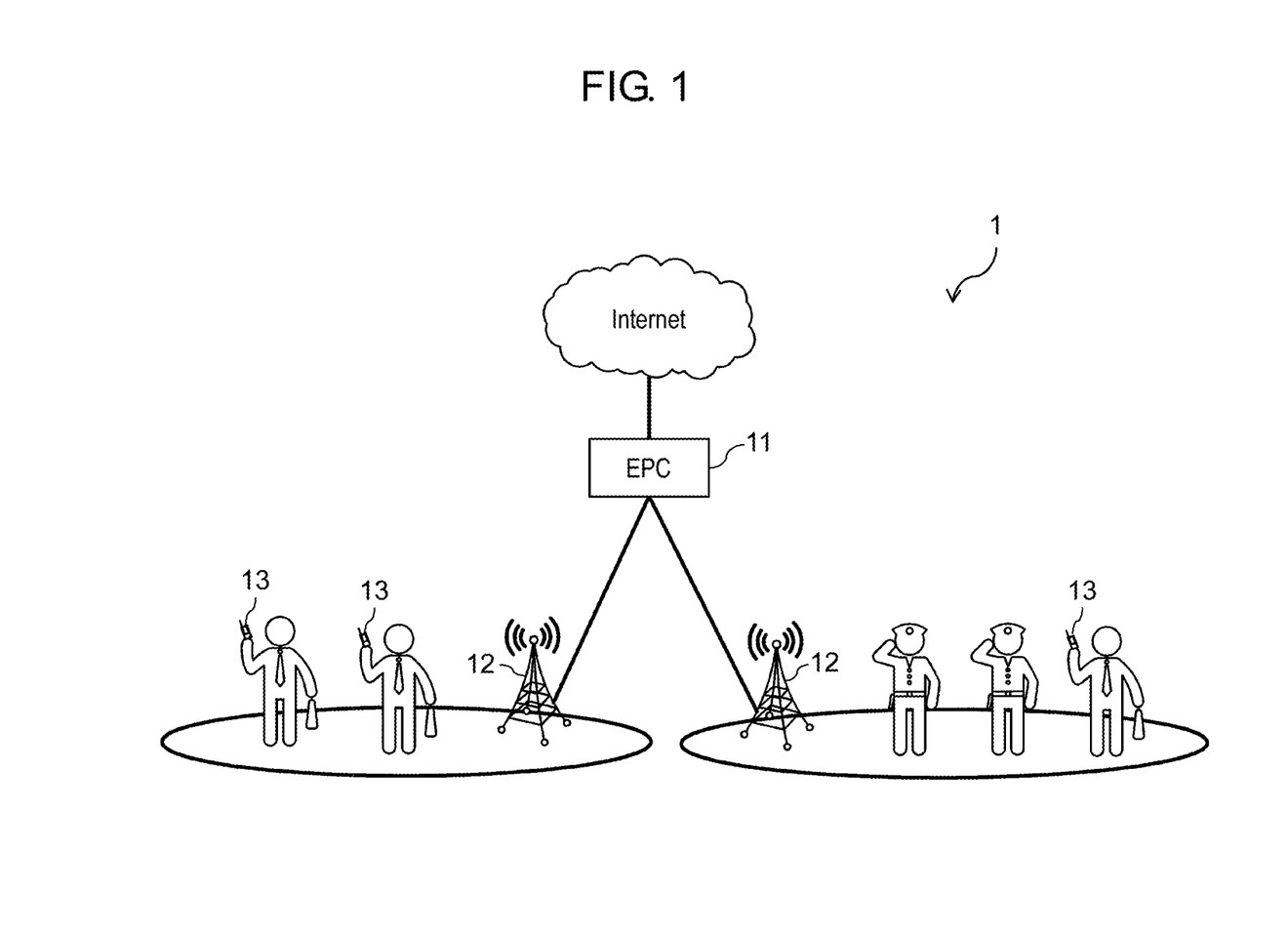
FIG. 1 is a view illustrating a configuration of a communication system according to a first exemplary embodiment.

With reference to FIG. 1, a configuration of communication system 1 according to a first exemplary embodiment of the present disclosure will be described below in detail.

Communication system 1 includes evolved packet core (EPC) 11, eNodeB 12 as a base station, and UE 13 as a terminal.

EPC 11 includes a mobility management entity (MME) that handles a control plane (C-plane) for network control, a serving gateway (S-GW) that handles a user plane (U-plane) serving as packet data of user data, and a packet data network gateway (PDN or P-GW) for connecting to an external network such as the Internet.

EPC 11 is connected to a network such as the Internet, determines a property of eNodeB 12 (specific base station) based on base station identification information included in a request signal received from eNodeB 12, and transmits information (hereinafter, referred to as "offset information") indicating an offset value of each parameter of the QCI according to the property to eNodeB 12.

Based on QoS information defined in the 3GPP, eNodeB 12 performs scheduling of packets to be transmitted or received between eNodeB 12 and UE 13 in its cell. In eNodeB 12, the QoS information is corrected based on the offset information received from EPC 11, a notification signal for reporting the offset information is generated, and the generated notification signal is wirelessly transmitted to UE 13.

Based on the QoS information, UE 13 performs scheduling of the packets to be wirelessly transmitted or received between eNodeB 12 and UE 13. UE 13 corrects the QoS information based on the offset information reported by the notification signal received from eNodeB 12.

<Configuration of EPC>

Figure 2:
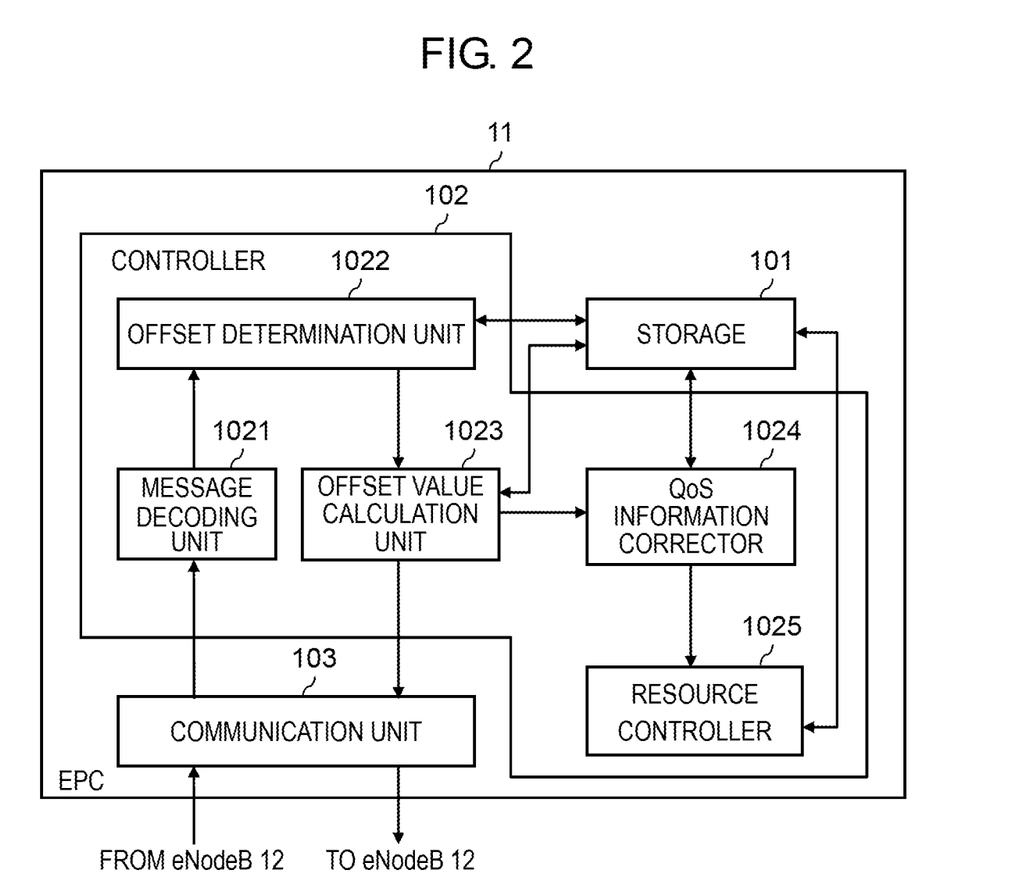
FIG. 2 is a block diagram illustrating a configuration of a control station according to the first exemplary embodiment.

Hereinafter, a configuration of EPC 11 according to the first exemplary embodiment of the present disclosure will be described below in detail, with reference to FIG. 2.

EPC 11 mainly includes storage 101, controller 102, and communication unit 103. Controller 102 includes message decoding unit 1021, offset determination unit 1022, offset value calculation unit 1023, QoS information corrector 1024, and resource controller 1025. Message decoding unit 1021, offset determination unit 1022, offset value calculation unit 1023, QoS information corrector 1024, and resource controller 1025 are configured as a functional block when controller 102 executes a control program.

Figure 3:
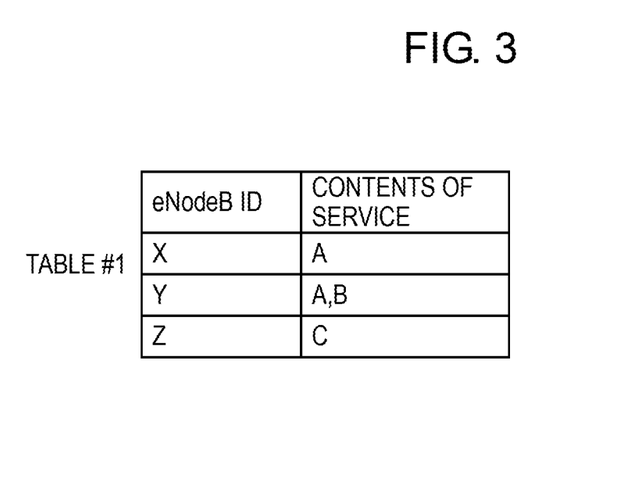
FIG. 3 is a diagram illustrating a table according to the first exemplary embodiment.

As illustrated in FIG. 3, storage 101 prestores table #1 associating base station identification information (eNodeB ID) for identifying eNodeB 12 with contents of service provided by eNodeB 12.

Figure 4:
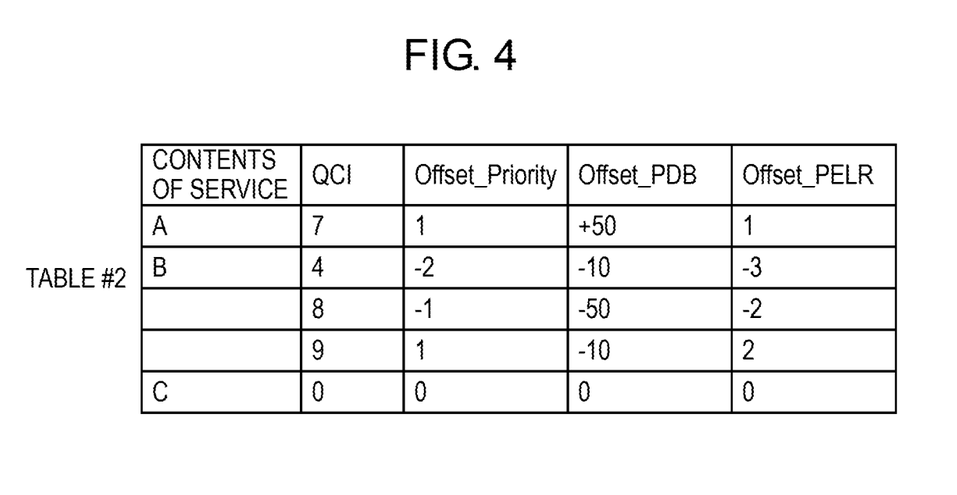
FIG. 4 is a diagram illustrating a table according to the first exemplary embodiment.

As illustrated in FIG. 4, storage 101 also prestores table #2 associating contents of service with a QCI value, an offset value of priority (Offset_Priority), an offset value of the PDB (Offset_PDB), and an offset value of the PELR (Offset_PELR).

Table #1 and table #2 are prepared in advance by an operator, and modified at any timing.

Storage 101 also stores the QoS information. The QoS information is information of each parameter such as the GBR, the priority, the PDB, or the PELR, which is defined for each QCI value by the 3GPP.

Controller 102 is, for example, a central processing unit (CPU), determines the property (contents of service) of the specific base station that has transmitted the request signal based on the base station identification information included in a message input from communication unit 103 and a reference result of each table stored in storage 101, determines whether offset (correction) of each parameter is required based on the property, and outputs, to communication unit 103, offset information corresponding to the property, when the correction is required. Controller 102 also performs scheduling of packets to be transmitted or received between EPC 11 and eNodeB 12 based on the QoS information, and corrects the QoS information based on the offset information.

Message decoding unit 1021 decodes the message input from communication unit 103. When the base station identification information is included in the decoded message, message decoding unit 1021 outputs the base station identification information to offset determination unit 1022.

Offset determination unit 1022 determines the contents of the service (property) associated with the base station identification information input from message decoding unit 1021, from table #1 stored in storage 101. Offset determination unit 1022 also determines to use offset, when each offset value of the priority, the PDB, and the PELR associated with the determined service is not "0", from table #2 stored in storage 101. In contrast, offset determination unit 1022 determines not to use the offset, when each offset value of the priority, the PDB, and the PELR associated with the determined service is "0", from table #2 stored in storage 101. Offset determination unit 1022 outputs the contents of the determined service and the determination result as to whether to use the offset, to offset value calculation unit 1023.

When the determination result input from offset determination unit 1022 is a determination result to use the offset, offset value calculation unit 1023 decides each offset value of the priority, the PDB, and the PELR associated with the contents of the service input from offset determination unit 1022, from table #2 stored in storage 101. Offset value calculation unit 1023 outputs each pieces of offset information of the priority, the PDB, and the PELR thus decided to QoS information corrector 1024 and communication unit 103.

QoS information corrector 1024 corrects the QoS information stored in storage 101 using each pieces of offset information input from offset value calculation unit 1023. For example, when offset information associated with contents A of the service in table #2 illustrated in FIG. 4 is input from offset value calculation unit 1023, QoS information corrector 1024 corrects (offsets) each parameter of the priority, the PDB, and the PELR of the QCI value of 7 in the QoS information stored in storage 101. The priority, the PDB, and the PELR are corrected (offset) by "+1", "+50", and "$\times 10^1$", respectively.

QoS information corrector 1024 also outputs the QoS information after correction to resource controller 1025.

Based on the QoS information stored in storage 101, resource controller 1025 performs scheduling of the packets to be transmitted or received between EPC 11 and eNodeB 12. When the QoS information after correction is input from QoS information corrector 1024, resource controller 1025 performs scheduling of the packets to be transmitted or received between EPC 11 and eNodeB 12, based on the QoS information after correction.

Communication unit 103 performs predetermined reception processing to receive a signal transmitted from eNodeB 12, and extracts a message included in the received signal to output the message to message decoding unit 1021 in controller 102. Communication unit 103 also performs predetermined transmission processing to generate a signal including the offset information input from offset value calculation unit 1023 in controller 102 and transmit the signal to eNodeB 12.

<Configuration of eNodeB>

Figure 5:
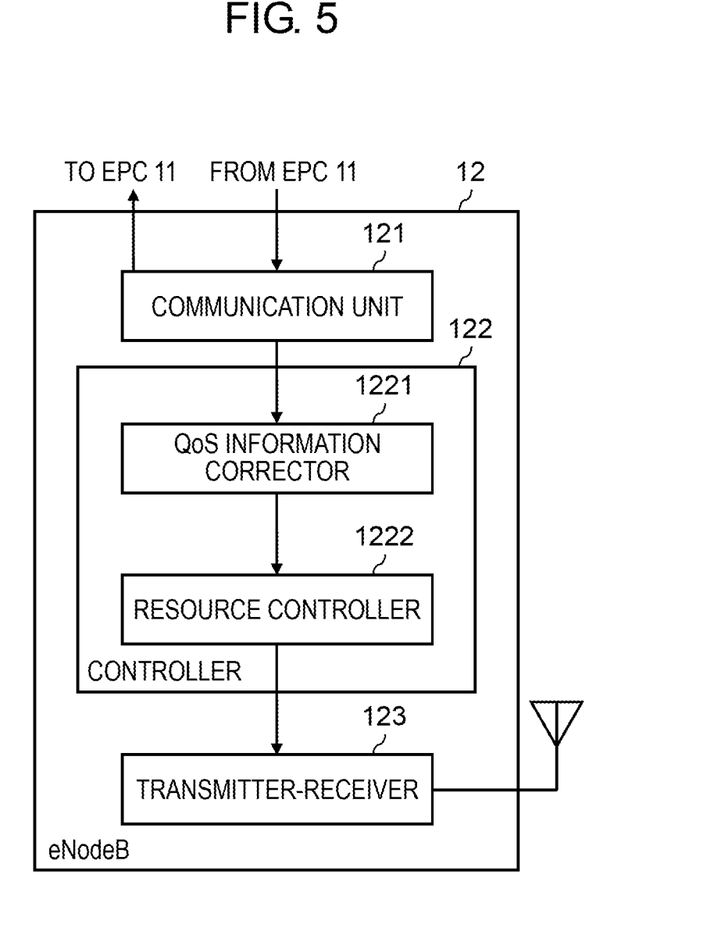
FIG. 5 is a block diagram illustrating a configuration of a base station according to the first exemplary embodiment.

Hereinafter, a configuration of eNodeB 12 according to the first exemplary embodiment of the present disclosure will be described below in detail, with reference to FIG. 5.

eNodeB 12 mainly includes communication unit 121, controller 122, and transmitter-receiver 123. Controller 122 includes QoS information corrector 1221 and resource controller 1222. QoS information corrector 1221 and resource controller 1222 are configured as a functional block when controller 122 executes a control program.

Communication unit 121 performs predetermined reception processing to receive the signal transmitted from EPC 11, and extracts the offset information included in the received signal to output the offset information to QoS information corrector 1221 in controller 122.

Controller 122 is, for example, a CPU, performs scheduling of the packets to be transmitted or received between EPC 11 and eNodeB 12, and between eNodeB 12 and UE 13 based on the QoS information, and corrects the QoS information based on the offset information received from EPC 11.

QoS information corrector 1221 corrects the QoS information that has already been obtained using the offset information input from communication unit 121, and outputs the QoS information after correction and the offset information to resource controller 1222.

Based on the QoS information, resource controller 1222 performs scheduling of the packets to be transmitted or received between EPC 11 and eNodeB 12, and between eNodeB 12 and UE 13. When the QoS information after correction is input from QoS information corrector 1221, resource controller 1222 performs scheduling of the packets to be transmitted or received between EPC 11 and eNodeB 12, and between eNodeB 12 and UE 13 based on the QoS information after correction. When the offset information is input from QoS information corrector 1221, resource controller 1222 generates a new notification signal including the offset information, or includes the offset information in an existing notification signal, to output the notification signal including the offset information to transmitter-receiver 123.

Transmitter-receiver 123 performs predetermined wireless processing, thereby converting the notification signal input from resource controller 1222 in controller 122 into a wireless signal to wirelessly transmit the wireless signal to UE 13.

<Configuration of UE>

Figure 6:
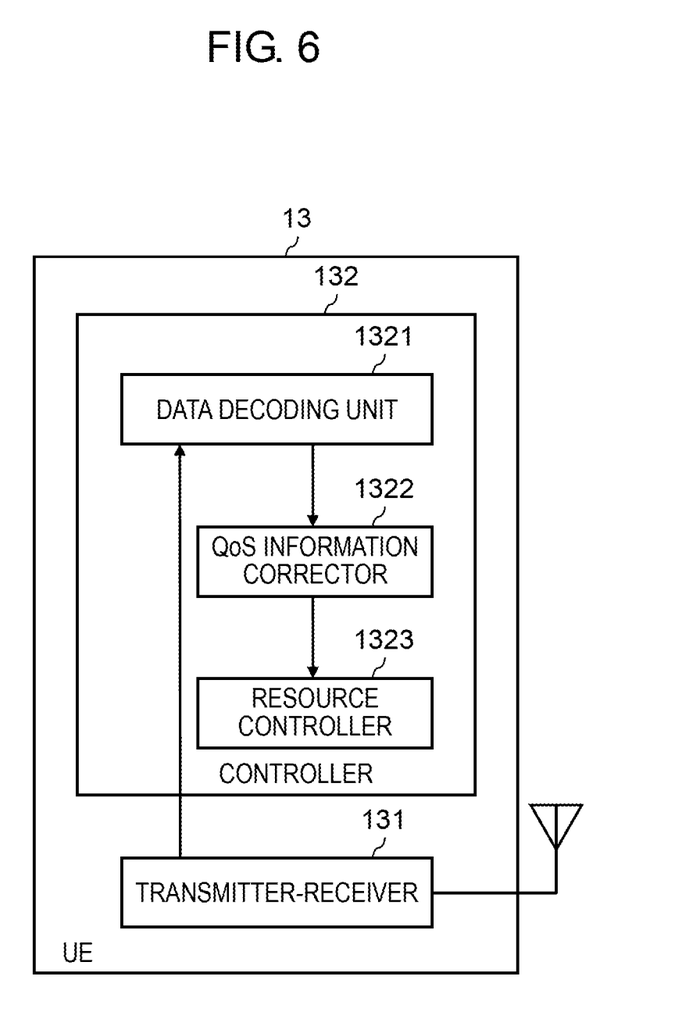
FIG. 6 is a block diagram illustrating a configuration of a terminal according to the first exemplary embodiment.

A configuration of UE 13 according to the first exemplary embodiment of the present disclosure will be described below in detail, with reference to FIG. 6.

UE 13 mainly includes transmitter-receiver 131 and controller 132. Controller 132 includes data decoding unit 1321, QoS information corrector 1322, and resource controller 1323. Data decoding unit 1321, QoS information corrector 1322, and resource controller 1323 are configured as a functional block when controller 132 executes a control program.

Transmitter-receiver 131 performs predetermined wireless processing to receive the wireless signal wirelessly transmitted from eNodeB 12, and converts the wireless signal into the notification signal to output the notification signal to data decoding unit 1321 in controller 132.

Controller 132 is, for example, a CPU, performs scheduling of packets to be transmitted or received between eNodeB 12 and UE 13 based on the QoS information, and corrects the QoS information based on the offset information received from eNodeB 12.

Data decoding unit 1321 obtains a message included in the notification signal input from transmitter-receiver 131. When the obtained message includes information indicating the offset value, data decoding unit 1321 outputs the information indicating the offset value to QoS information corrector 1322.

QoS information corrector 1322 corrects QoS information that has already been obtained using the offset information input from data decoding unit 1321. QoS information corrector 1322 also outputs the QoS information after correction to resource controller 1323.

Based on the QoS information, resource controller 1323 performs scheduling of the packets to be transmitted or received between eNodeB 12 and UE 13. When the QoS information after correction is input from QoS information corrector 1322, resource controller 1323 performs scheduling of the packets to be transmitted or received between eNodeB 12 and UE 13 based on the QoS information after correction.

<Communication Procedure>

Figure 7:
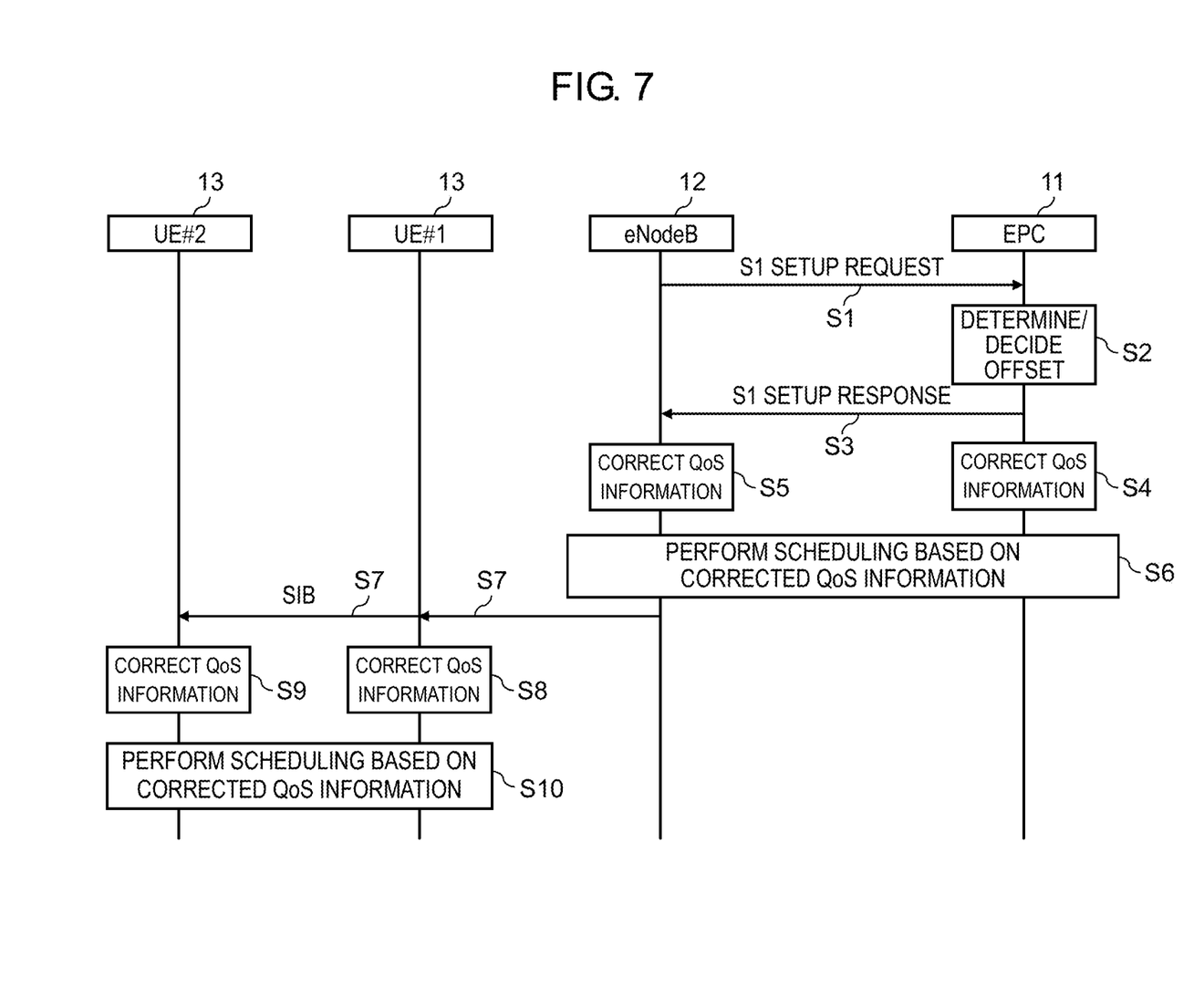
FIG. 7 is a view illustrating a communication procedure of the communication system according to the first exemplary embodiment.

A communication procedure according to the first exemplary embodiment of the present disclosure will be described below in detail, with reference to FIG. 7.

First, eNodeB 12 transmits message S1 SETUP REQUEST including the base station identification information to EPC 11, and EPC 11 receives message S1 SETUP REQUEST from eNodeB 12 (S1).

Next, EPC 11 determines whether to use the offset. When the offset is used, EPC 11 decides each offset value of the priority, the PDB, and the PELR based on the base station identification information, and table #1 and table #2 stored in storage 101 (S2).

Next, EPC 11 transmits S1 SETUP RESPONSE including each pieces of offset information of the priority, the PDB, and the PELR thus decided to eNodeB 12, and eNodeB 12 receives S1 SETUP RESPONSE including the offset information (S3).

Next, EPC 11 corrects the obtained QoS information using the offset information (S4). Further, eNodeB 12 corrects the obtained QoS information using the offset information (S5).

Next, based on the corrected QoS information, EPC 11 and eNodeB 12 perform scheduling of the packets to be transmitted or received (S6).

Next, eNodeB 12 transmits notification signal SIB including the offset information to UE #1 and UE #2 (S7).

Next, UE #1 corrects the obtained QoS information using the offset information (S8). Further, UE #2 corrects the obtained QoS information using the offset information (S9).

Next, based on the corrected QoS information, UE #1 and UE #2 perform scheduling of the packets to be transmitted or received (S10).

<Effects>

As described above, according to the present exemplary embodiment, based on the base station identification information included in the received request signal, the property of the specific base station that has transmitted the request signal is determined, and the offset information of each parameter of the QCI corresponding to the property of the specific base station is transmitted to the specific base station. With this configuration, the offset value of each parameter of the QCI can flexibly be set without increasing the traffic.

Second Exemplary Embodiment

In a second exemplary embodiment of the present disclosure, a configuration of a communication system is the same as that in FIG. 1, and therefore description thereof is omitted.

<Configuration of EPC>

Figure 8:
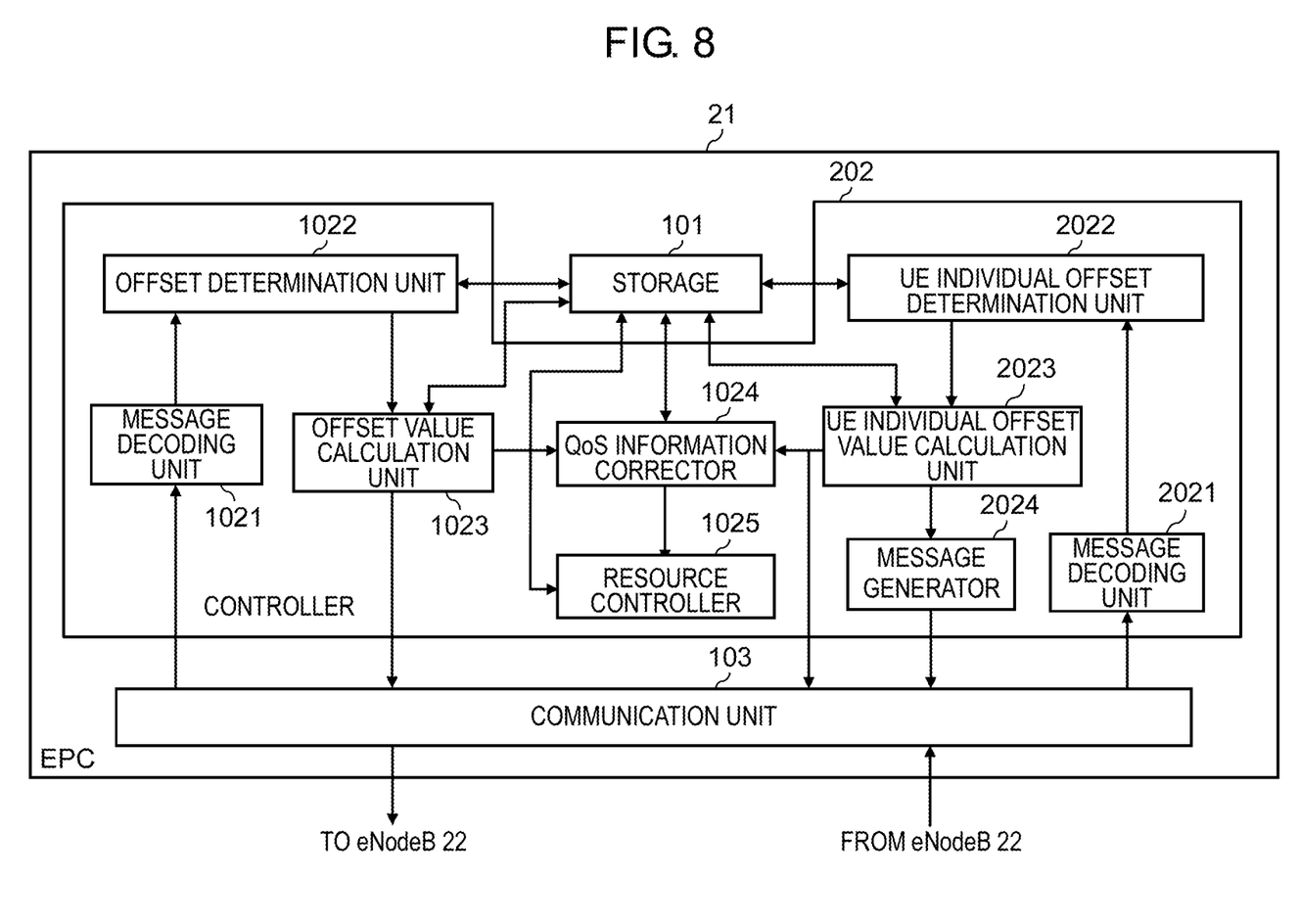
FIG. 8 is a block diagram illustrating a configuration of a control station according to a second exemplary embodiment.

A configuration of EPC 21 according to the second exemplary embodiment of the present disclosure will be described below in detail, with reference to FIG. 8. Note that, in the configuration of EPC 21 illustrated in FIG. 8, portions common to those in the configuration of EPC 11 illustrated in FIG. 2 are attached with identical reference signs, and description thereof is omitted.

Compared to EPC 11, EPC 21 includes controller 202 instead of controller 102. Further, in EPC 21, functions of storage 101 and communication unit 103 are added to EPC 11. Compared to controller 102, controller 202 further includes message decoding unit 2021, UE individual offset determination unit 2022, UE individual offset value calculation unit 2023, and message generator 2024. Message decoding unit 2021, UE individual offset determination unit 2022, UE individual offset value calculation unit 2023, and message generator 2024 are configured as a functional block when controller 202 executes a control program. Further, in controller 202, a function of QoS information corrector 1024 is added to controller 102.

Figure 9:
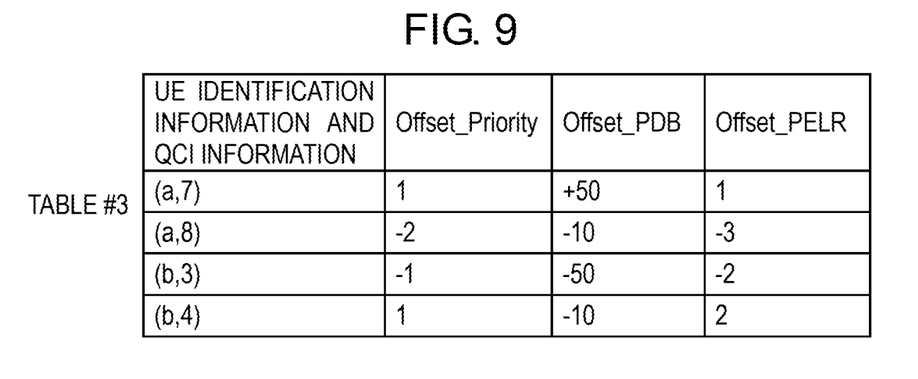
FIG. 9 is a diagram illustrating a table according to the second exemplary embodiment.

Storage 101 prestores table #1 illustrated in FIG. 3 and table #2 illustrated in FIG. 4. Furthermore, as illustrated in FIG. 9, storage 101 prestores table #3 associating the UE identification information and the QCI information with the QCI value, an offset value of the priority, an offset value of the PDB, and an offset value of the PELR. In table #3 illustrated in FIG. 9, alphabets indicate the UE identification information, and numerical values indicate the QCI information.

Controller 202 outputs the offset information of each parameter for each UE to communication unit 103 based on a set of the QCI information and the UE identification information of UE 23 included in a message input from communication unit 103, and the reference result of table #3 stored in storage 101. Also, controller 202 performs scheduling of the packets to be transmitted or received between EPC 21 and eNodeB 22 based on the QoS information, and corrects the QoS information based on the offset information of each parameter for each UE. Note that functions other than the above functions in controller 202 are identical to those in controller 102.

Message decoding unit 2021 decodes the message input from communication unit 103. When the decoded message includes the set of the QCI information and the UE identification information, message decoding unit 2021 outputs the set of the QCI information and the UE identification information to UE individual offset determination unit 2022.

UE individual offset determination unit 2022 determines to use the offset, when each offset value of the priority, the PDB, and the PELR, which are associated with the set of the QCI information and the UE identification information of UE that requests generation of a bearer, the set being input from message decoding unit 2021, in table #3 illustrated in FIG. 9 and stored in storage 101, is not "0". On the other hand, UE individual offset determination unit 2022 determines not to use the offset, when each offset value of the priority, the PDB, and the PELR, which are associated with the set of the QCI information and the UE identification information of the UE that requests generation of the bearer, the set being input from message decoding unit 2021, in table #3 stored in storage 101, is "0". UE individual offset determination unit 2022 outputs the UE identification information and the determination result, for each UE, as to whether to use the offset to UE individual offset value calculation unit 2023.

When the determination result input from UE individual offset determination unit 2022 is a determination result to use the offset, UE individual offset value calculation unit 2023 decides, for each UE, each offset value of the priority, the PDB, and the PELR associated with the UE identification information input from UE individual offset determination unit 2022, from table #3 stored in storage 101. UE individual offset value calculation unit 2023 outputs each piece of offset information of the priority, the PDB, and the PELR thus decided for each UE, to QoS information corrector 1024 and message generator 2024.

Message generator 2024 generates a message including each piece of offset information for each UE, which is input from UE individual offset value calculation unit 2023, and output the message to communication unit 103.

QoS information corrector 1024 corrects the QoS information stored in storage 101 using each piece of offset information for each UE, which is input from UE individual offset value calculation unit 2023. Alternatively, QoS information corrector 1024 corrects the QoS information stored in storage 101 using each piece of offset information input from offset value calculation unit 1023, and further corrects the corrected QoS information using each piece of offset information for each UE, which is input from UE individual offset value calculation unit 2023.

Figure 10:
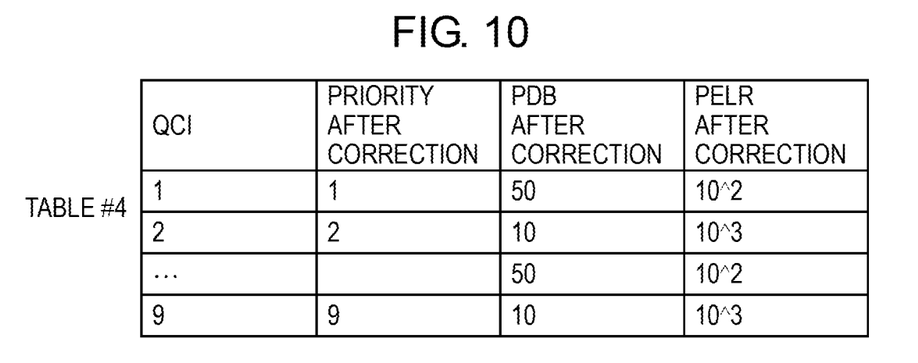
FIG. 10 is a diagram illustrating a table according to the second exemplary embodiment.
Figure 11:
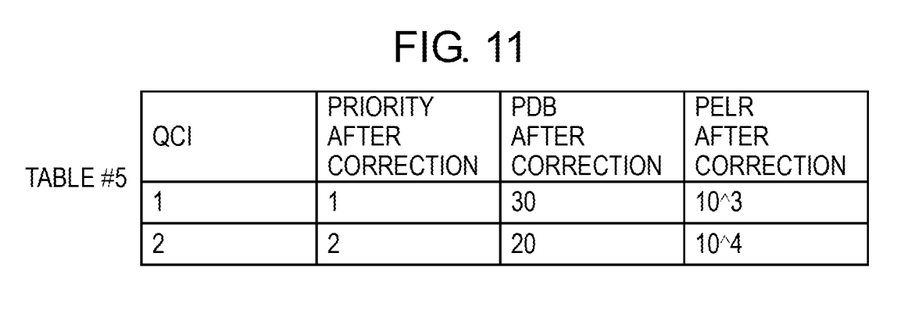
FIG. 11 is a diagram illustrating a table according to the second exemplary embodiment.

QoS information corrector 1024 manages the QoS information while dividing the QoS information into table #4 for eNodeB 22 illustrated in FIG. 10 and table #5 for UE 23 illustrated in FIG. 11, for example.

QoS information corrector 1024 also outputs the QoS information after correction to resource controller 1025.

Communication unit 103 performs predetermined reception processing to receive a signal transmitted from eNodeB 22, and extracts a message included in the received signal to output the message to message decoding unit 1021 and message decoding unit 2021 in controller 202. Further, communication unit 103 performs predetermined transmission processing to generate a signal including the offset information input from offset value calculation unit 1023, the offset information for each UE, which is input from UE individual offset value calculation unit 2023, and the message input from message generator 2024, and output the signal to eNodeB 22.

<Configuration of eNodeB>

Figure 12:
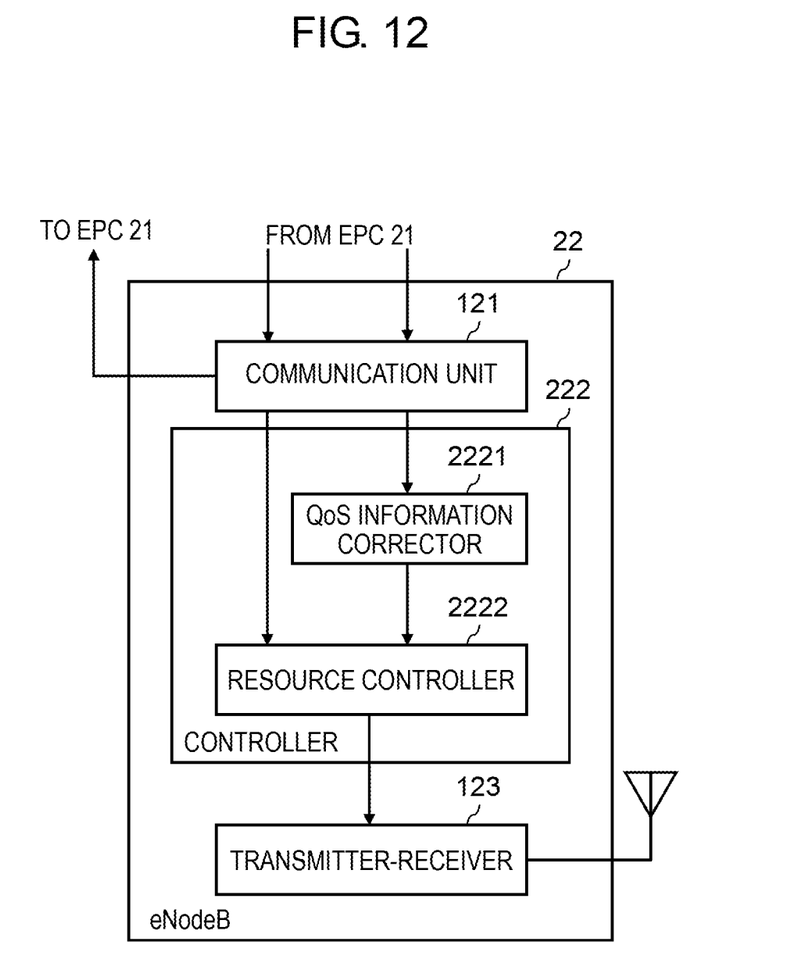
FIG. 12 is a block diagram illustrating a configuration of a base station according to the second exemplary embodiment.

A configuration of eNodeB 22 according to the second exemplary embodiment of the present disclosure will be described below in detail, with reference to FIG. 12. Note that, in the configuration of eNodeB 22 illustrated in FIG. 12, portions common to those in the configuration of eNodeB 12 illustrated in FIG. 5 are attached with identical reference signs, and description thereof is omitted.

Compared to eNodeB 12, eNodeB 22 includes controller 222 instead of controller 122. Controller 222 includes QoS information corrector 2221 and resource controller 2222. QoS information corrector 2221 and resource controller 2222 are configured as a functional block when controller 222 executes a control program.

Communication unit 121 performs predetermined reception processing to receive a signal transmitted from EPC 21. Communication unit 121 extracts the offset information included in the received signal to output the offset information to QoS information corrector 2221 in controller 222, and outputs a message included in the received signal to resource controller 2222 in controller 222.

Controller 222 is, for example, a CPU, performs scheduling of packets to be transmitted or received between EPC 21 and eNodeB 22, and between eNodeB 22 and UE 23 based on the QoS information, and corrects the QoS information based on the information indicating the offset value, which is received from EPC 21.

QoS information corrector 2221 corrects the QoS information that has already been obtained and is used in eNodeB 22 using the information that is input from communication unit 121 and indicates the offset value, and outputs information indicating the QoS information after correction and the offset value to resource controller 2222.

Based on the QoS information, resource controller 2222 performs scheduling of the packets to be transmitted or received between EPC 21 and eNodeB 22, and between eNodeB 22 and UE 23. When the QoS information after correction is input from QoS information corrector 2221, resource controller 2222 performs scheduling of the packets to be transmitted or received between EPC 21 and eNodeB 22, and between eNodeB 22 and UE 23 based on the QoS information after correction. At this time, resource controller 2222 performs scheduling of the packets to be transmitted or received between eNodeB 22 and UE 23 whose QoS information is individually corrected, based on the QoS information individually corrected for each UE 23. Further, resource controller 2222 outputs a signal that is individually transmitted for each UE and includes the message input from communication unit 121 (hereinafter, referred to as a "UE individual signal") to transmitter-receiver 123 while allocating a frequency resource. When the offset information is input from QoS information corrector 2221, resource controller 2222 generates a new notification signal including the offset information, or includes the offset information in an existing notification signal, to output the notification signal including the offset information to transmitter-receiver 123.

Transmitter-receiver 123 performs predetermined wireless processing, thereby converting the notification signal and the UE individual signal that are input from resource controller 2222 in controller 222 into a wireless signal to wirelessly transmit the wireless signal to UE 23.

<Configuration of UE>

Figure 13:
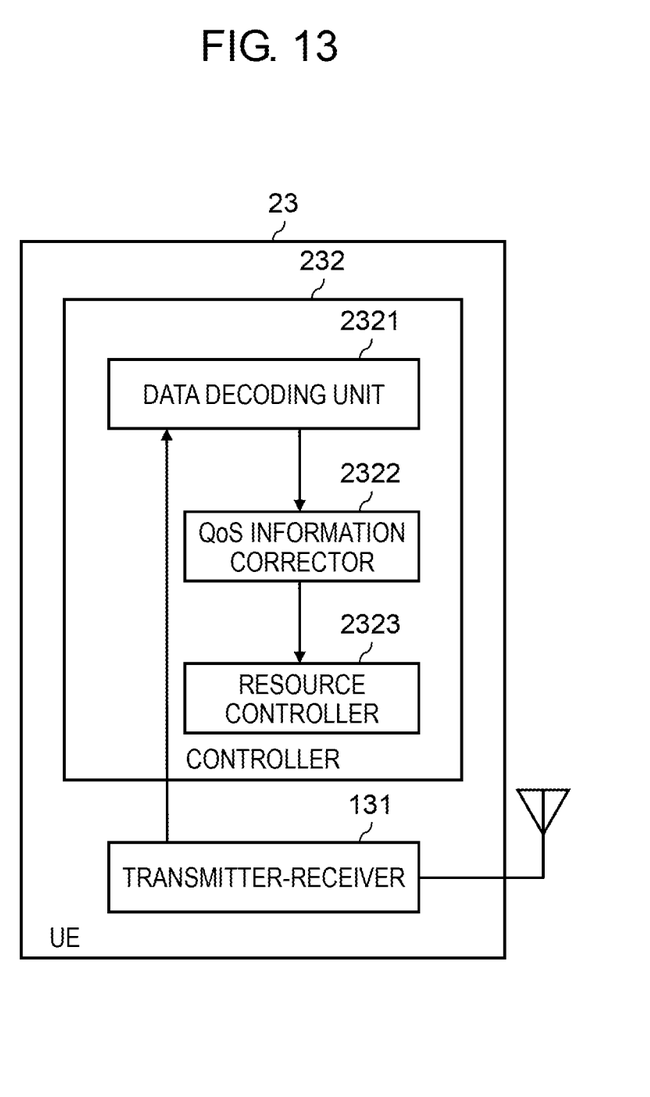
FIG. 13 is a block diagram illustrating a configuration of a terminal according to the second exemplary embodiment.

A configuration of UE 23 according to the second exemplary embodiment of the present disclosure will be described below in detail, with reference to FIG. 13. Note that, in the configuration of UE 23 illustrated in FIG. 13, portions common to those in the configuration of UE 13 illustrated in FIG. 6 are attached with identical reference signs, and description thereof is omitted.

Compared to UE 13, UE 23 includes controller 232 instead of controller 132. Controller 232 includes data decoding unit 2321, QoS information corrector 2322, and resource controller 2323. Data decoding unit 2321, QoS information corrector 2322, and resource controller 2323 are configured as a functional block when controller 232 executes a control program.

Transmitter-receiver 131 performs predetermined wireless processing to receive the wireless signal wirelessly transmitted from eNodeB 22, and converts the wireless signal into the notification signal or the UE individual signal to output the notification signal or the UE individual signal to data decoding unit 2321 in controller 232.

Controller 232 is, for example, a CPU, performs scheduling of packets to be transmitted or received between eNodeB 22 and UE 23 based on the QoS information, and corrects the QoS information based on the offset information received from eNodeB 22.

Data decoding unit 2321 obtains a message included in the UE individual signal input from transmitter-receiver 131. When the obtained message includes information indicating an offset value, data decoding unit 2321 outputs the information indicating the offset value to QoS information corrector 2322.

QoS information corrector 2322 corrects QoS information that has already been obtained using the offset information input from data decoding unit 2321. QoS information corrector 2322 also outputs the QoS information after correction to resource controller 2323. QoS information corrector 2322 also manages the QoS information only with, for example, table #5 for UE 23 that is individually corrected, table #5 being illustrated in FIG. 11.

Based on the QoS information, resource controller 2323 performs scheduling of the packets to be transmitted or received between eNodeB 22 and UE 23. When the QoS information after correction is input from QoS information corrector 2322, resource controller 2323 performs scheduling of the packets to be transmitted or received between eNodeB 22 and UE 23 based on the QoS information after correction.

<Communication Procedure>

Figure 14:
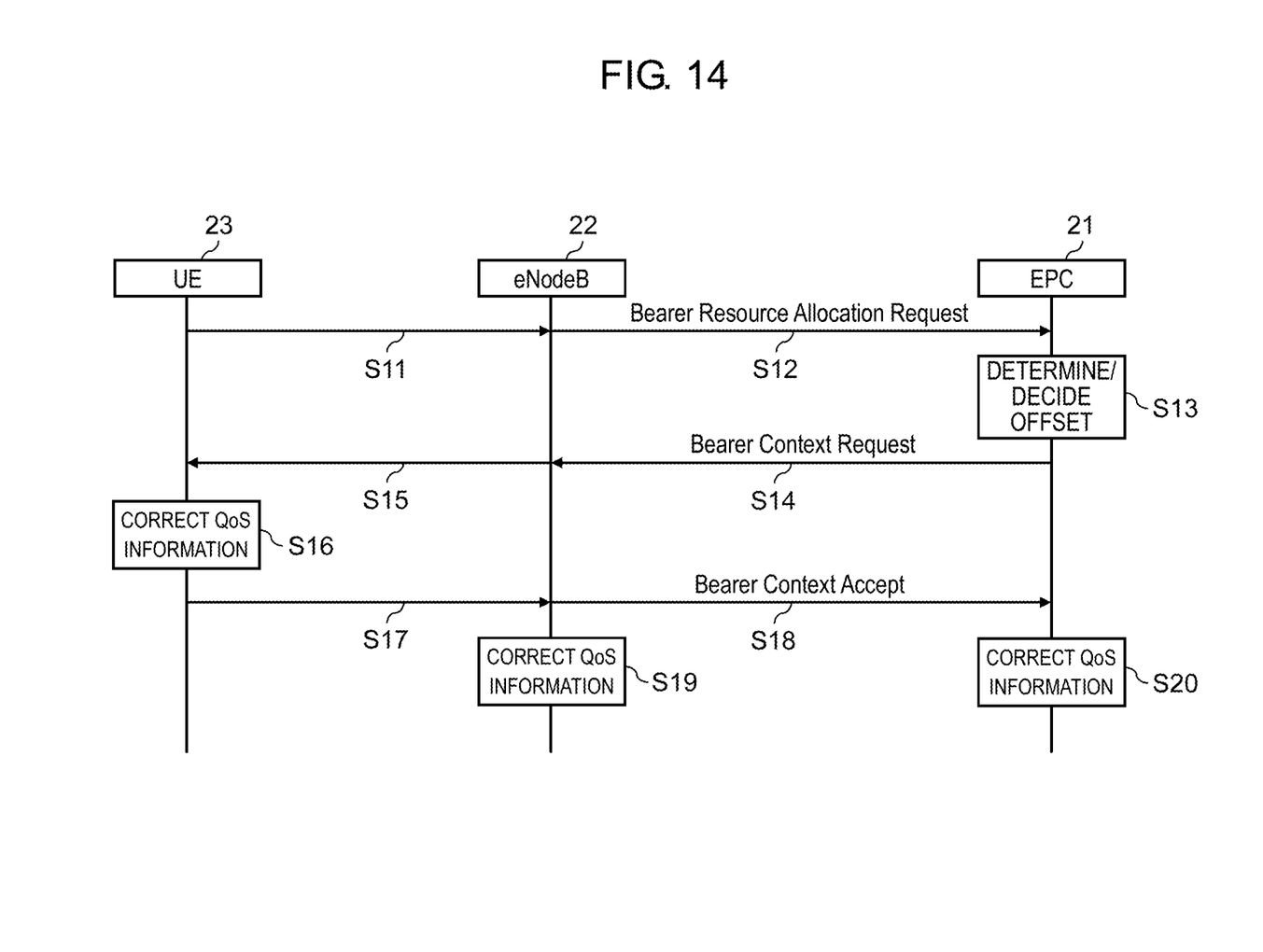
FIG. 14 is a view illustrating a communication procedure of a communication system according to the second exemplary embodiment.

A communication procedure according to the second exemplary embodiment of the present disclosure will be described below in detail, with reference to FIG. 14.

First, UE 23 wirelessly transmits message Bearer Resource Allocation Request including the QCI information to eNodeB 22, and eNodeB 22 wirelessly receives message Bearer Resource Allocation Request including the QCI information (S11).

Next, eNodeB 22 transmits, to EPC 21, message Bearer Resource Allocation Request including the QCI information, which is wirelessly received, and EPC 21 receives message Bearer Resource Allocation Request including the QCI information (S12).

Next, EPC 21 determines whether to use offset. When the offset is used, EPC 21 decides each offset value of the priority, the PDB, and the PELR (S13).

Next, EPC 21 transmits message Bearer Context Request including each piece of offset information to eNodeB 22, and eNodeB 22 receives message Bearer Context Request including each piece of information indicating offset value (S14).

Next, eNodeB 22 wirelessly transmits message Bearer Context Request including each piece of offset information to UE 23, and UE 23 receives message Bearer Context Request including each piece of offset information (S15).

Next, UE 23 corrects the QoS information (S16).

Next, UE 23 wirelessly transmits message Bearer Context Accept to eNodeB 22, and eNodeB 22 wirelessly receives message Bearer Context Accept (S17).

Next, eNodeB 22 transmits message Bearer Context Accept to EPC 21, and EPC 21 receives message Bearer Context Accept (S18).

Next, eNodeB 22 corrects the QoS information (S19). EPC 21 also corrects the QoS information (S20).

<Effects>

As described above, according to the present exemplary embodiment, based on the set of the QCI information corresponding to the property of the specific base station and the UE identification information, the offset value of each parameter of the QCI is set only to the UE that requires setting of the offset value. Accordingly, the offset value of each parameter of the QCI is not required to be set to each and every UE, whereby management of the UE can be simplified.

Furthermore, according to the present exemplary embodiment, the eNodeB can notify the UE of the offset information using the notification signal, whereby a transmission amount of signaling can be reduced, and an increase in traffic of an uplink can be suppressed.

Note that, in the present disclosure, kinds, disposition, a number of members, and the like are not limited to the above-described exemplary embodiments, and for example, the components are appropriately replaced to components having similar actions and effects, whereby the exemplary embodiments can be modified as appropriate without departing from the gist of the present disclosure.

Specifically, in the first and second exemplary embodiments described above, EPC 11 or EPC 21 prestores table #1 associating the base station identification information with the contents of the service. However, the EPC may obtain information about the contents of the service from the eNodeB, and may decide each offset value associated with the contents of the service obtained, from table #2. In this case, the information about the contents of the service is included in the new message or the existing message to be transmitted from the eNodeB to the EPC.

The present disclosure can be realized by software, hardware, or software in cooperation with hardware. Each functional block used in the description of each exemplary embodiment described above can be partly or entirely realized by an LSI such as an integrated circuit, and each process described in the each exemplary embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus. Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof. The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)". The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus. The communication apparatus also may include an infrastructure facility, such as a base station, an access point, and any other apparatus, device or system that communicates with or controls apparatuses such as those in the above non-limiting examples.

A communication control apparatus of the present disclosure includes a storage, which, in operation, stores an offset value of each of parameters of a quality of service (QoS) class identifier (QCI) in association with a property of each of base stations, offset determination circuitry, which, in operation, determines, based on base station identification information included in a request signal that is received, a property of a specific base station that has transmitted the request signal, and determines whether offset of each of the parameters is required for the specific base station based on the property, offset calculation circuitry, which, in operation, calculates an offset value of each of the parameters corresponding to the property of the specific base station when the offset is required, and a transmitter, which, in operation, transmits information indicating the offset value to the specific base station.

In the communication control apparatus of the present disclosure, the storage may store an offset value of each of the parameters of the QCI in association with each of terminals, the communication control apparatus may further include terminal individual offset determination circuitry, which, in operation, determines, based on terminal identification information included in another request signal that is received, whether offset of each of the parameters of an individual terminal that has transmitted the other request signal is required, and terminal individual offset calculation circuitry, which, in operation, calculates an offset value of each of the parameters of the individual terminal when the offset of the individual terminal is required, and the transmitter may transmit information indicating the offset value of each of the parameters of the individual terminal to the individual terminal through the specific base station.

A quality of service (QoS) control method of the present disclosure includes receiving a request signal including base station identification information from a specific base station, determining a property of the specific base station based on the base station identification information, determining whether offset of each of parameters of a QoS class identifier (QCI) is required for the specific base station based on the property, calculating an offset value of each of the parameters corresponding to the property of the specific base station when the offset is required, and transmitting information indicating the offset value to the specific base station.

The QoS control method of the present disclosure may include receiving a request signal including terminal identification information from an individual terminal through the specific base station, determining whether offset of each of the parameters of the individual terminal is required based on the terminal identification information, calculating the offset value of each of the parameters of the individual terminal when the offset of the individual terminal is required, and transmitting the information indicating the offset value of each of the parameters of the individual terminal to the individual terminal through the specific base station.

The present disclosure is suitable for a communication control apparatus and a QoS control method.

The invention claimed is:

1. A communication control apparatus comprising:
   a storage, which, in operation, stores an offset value of each of parameters of a quality of service (QoS) class identifier (QCI) in association with a property of each of base stations;
   offset determination circuitry, which, in operation, determines, based on base station identification information included in a request signal that is received, a property of a specific base station that has transmitted the request signal, and determines whether offset of each of the parameters is required for the specific base station based on the property;
   offset calculation circuitry, which, in operation, calculates the offset value of each of the parameters corresponding to the property of the specific base station when the offset is required; and
   a transmitter, which, in operation, transmits information indicating the offset value to the specific base station.

2. The communication control apparatus according to claim 1, wherein
   the storage stores an offset value of each of the parameters of the QCI in association with each of a plurality of terminals,
   the communication control apparatus further comprises:
      terminal individual offset determination circuitry, which, in operation, determines, based on terminal identification information included in another request signal that is received, whether offset of each of the parameters of an individual terminal that has transmitted the other request signal is required, and
      terminal individual offset calculation circuitry, which, in operation, calculates the offset value of each of the parameters of the individual terminal when the offset of the individual terminal is required, and
   the transmitter transmits, to the individual terminal, information indicating the offset value of each of the parameters of the individual terminal through the specific base station.

3. A quality of service (QoS) control method comprising:
   receiving a request signal including base station identification information from a specific base station;
   determining a property of the specific base station based on the base station identification information;
   determining whether offset of each of parameters of a QoS class identifier (QCI) is required for the specific base station based on the property;
   calculating an offset value of each of the parameters corresponding to the property of the specific base station when the offset is required; and
   transmitting information indicating the offset value to the specific base station.

4. The QoS control method according to claim 3, further comprising:
   receiving a second request signal including terminal identification information from an individual terminal through the specific base station;
   determining whether offset of each of the parameters of the individual terminal is required based on the terminal identification information;
   calculating the offset value of each of the parameters of the individual terminal when the offset of the individual terminal is required; and
   transmitting, to the individual terminal, information indicating the offset value of each of the parameters of the individual terminal through the specific base station.

* * * * *